United States Patent
Rohlf et al.

(10) Patent No.: US 8,617,718 B2
(45) Date of Patent: Dec. 31, 2013

(54) MOLD-RESISTANT GYPSUM PANEL PAPER

(75) Inventors: Evan Vincent Rohlf, Tower Lakes, IL (US); Subhash Deodhar, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 354 days.

(21) Appl. No.: 12/899,263

(22) Filed: Oct. 6, 2010

(65) Prior Publication Data

US 2012/0088114 A1  Apr. 12, 2012

(51) Int. Cl.
*B32B 23/04* (2006.01)

(52) U.S. Cl.
USPC ............. 428/532; 428/536; 428/292.4

(58) Field of Classification Search
USPC ........ 428/532, 536, 292.4; 106/680; 442/385, 442/386
See application file for complete search history.

(56) References Cited

U.S. PATENT DOCUMENTS

| | | | |
|---|---|---|---|
| 2,475,781 A | 7/1949 | Gallup | |
| 2,806,811 A | 9/1957 | Hazmburg | |
| 3,159,640 A * | 12/1964 | McClure et al. | 546/290 |
| 3,918,981 A * | 11/1975 | Long | 106/16 |
| 3,998,944 A | 12/1976 | Long | |
| 4,020,237 A | 4/1977 | Von Hazmburg | |
| 4,372,814 A | 2/1983 | Johnstone et al. | |
| 4,448,639 A | 5/1984 | Long | |
| 4,548,676 A | 10/1985 | Johnstone et al. | |
| 4,853,085 A | 8/1989 | Johnstone et al. | |
| 4,959,272 A | 9/1990 | Long | |
| 5,939,203 A * | 8/1999 | Kappock et al. | 428/469 |
| 5,945,198 A | 8/1999 | Deodhar et al. | |
| 6,503,638 B1 | 1/2003 | Symons | |
| 6,680,127 B2 | 1/2004 | Capps | |
| 6,773,822 B2 | 8/2004 | Capps | |
| 6,893,752 B2 * | 5/2005 | Veeramasuneni et al. | 428/703 |
| 8,362,051 B2 * | 1/2013 | Tinetti et al. | 514/372 |
| 2001/0001218 A1 | 5/2001 | Luongo | |
| 2002/0017222 A1 | 2/2002 | Luongo | |
| 2006/0068186 A1 | 3/2006 | Leclercq et al. | |
| 2006/0194072 A1 | 8/2006 | Toreki et al. | |

* cited by examiner

*Primary Examiner* — Leszek Kiliman
(74) *Attorney, Agent, or Firm* — Greer, Burns & Crain, Ltd.; Pradip Sahu; Philip T. Petti

(57) ABSTRACT

A mold resistant gypsum panel having improved mold- and fungal-resistance to the gypsum panel facing paper is provided. Mold-resistant gypsum panels include a gypsum core formed from a gypsum slurry that has voids as a result of foaming of the gypsum slurry. A first paper is located on one side of the gypsum core and a second paper opposes the first paper. A first paper comprises at least one liner ply and at least one filler ply. A second paper also comprises at least one liner play and at least one filler ply. The first and second papers may be substantially the same. At least one of the first paper and the second paper also includes a biocide having 75% retention of the biocide. Also included in at least one of the first and second paper are a retention aid and a sizing agent.

21 Claims, No Drawings

MOLD-RESISTANT GYPSUM PANEL PAPER

BACKGROUND OF THE INVENTION

The present invention relates to a product and process for making gypsum panels. More particularly, the present invention relates to a gypsum panel having paper with an improved resistance to mold and mildew.

Gypsum panels are well known building products which have been used for years. They are used primarily as interior walls, floor and ceiling products, but also to a certain extent as exterior products. A slurry including calcium sulfate hemihydrate and water is used to form the gypsum core, and the gypsum slurry continuously deposited on a first paper moving beneath a mixer. A second paper is applied over the deposited gypsum slurry and the resultant assembly is formed into the shape of a panel. Calcium sulfate hemihydrate reacts with sufficient water to convert the hemihydrate into a matrix of interlocking calcium sulfate dihydrate crystals, causing it to set and to become firm, thereby forming the gypsum core. The continuous strip formed is conveyed on a belt until the calcined gypsum is set, and the strip is thereafter cut to form panels of desired length. The panels are then conveyed through a drying kiln to remove any excess moisture.

Fungi, such as mold and mildew, may grow in environments where four key elements are present. There must be spores present, nutrients for the fungi to metabolize and water. Temperature is the fourth key parameter for fungus growth, but numerous mold species thrive at the temperatures required for human habitation so this is often considered inherent for mold growth in buildings. Although various environments provide different amounts of each of these elements, water vapor and spores are constantly in the air. The spores require sufficient nutrients to be able to grow if they settle on a substrate where moisture is present.

While various nutrients are generally present in dust particles in the surrounding air, starches also provide sufficient nutrition for mold growth and are often present in both the face paper materials and the gypsum core of gypsum panels. In gypsum panels, starch is frequently used for a number of purposes. Starch may be used as an additive to promote adhesion between the gypsum core and the paper, for example, but cellulosic fibers also provide nutrition for mold growth. Sugar is optionally used to coat particles of calcium sulfate dihydrate that are then used as a set accelerator in the calcined gypsum slurry.

Other starches are also used to modify properties of the gypsum composition. Where gypsum board panels become wet and do not dry out readily, the use of starches in the paper and core materials provides a medium that is suitable for the growth of mold. Gypsum panels, even if not specially treated to make them mold-resistant, still will not usually experience mold growth problems in interior building applications or in other applications if they are kept dry or dry out readily after becoming wet.

However, there are some applications where gypsum panels are desirable for its fire resistance, but where the panels may become wet and not readily dry out. In high-rise buildings, for example, elevator shafts are built before the building is enclosed. One inch thick gypsum panels, such as Sheetrock® brand Gypsum Liner Panels by USG Corp., of Chicago, Ill., are used to line the elevator shafts to provide fire resistance. The elevator shaft wall may be exposed to rain during building construction and may not have the opportunity to dry thoroughly before the building is enclosed. Gypsum panels used in this environment, and other environments where mold growth is possible, are subject to improvement by increasing the resistance of the panels to the growth of mold.

Gypsum panels are known to utilize pressed paper treated with a biocide. Treated paper has generally been less effective to control mold growth for a number of reasons. Many biocides do not retain their efficacy through the process of drying the gypsum panels in a kiln due to the high temperatures and the porosity of the paper. In addition, the water used in the manufacturing of gypsum panels may itself contain mold spores, providing a source of spores from both the air and the set gypsum. Per environmental regulations, there is a limit to the insufficient concentration of biocide that can be present on the surfacing of the paper, and it appears that the maximum regulated concentration is to protect both the paper and the set gypsum core.

Attempts have been made to add biocides to the aqueous gypsum slurry, resulting in other problems. Water-soluble biocides tend to migrate with the excess water during the drying process, depositing on the covering when the water evaporates leaving the core unprotected. Biocides that are insoluble are difficult to disperse in the aqueous gypsum slurry and provide little to no protection for the paper facing material. Chemicals added directly to the gypsum slurry can also have detrimental effects on the properties of the set gypsum product. For example, when boric acid, a known biocide, is added to a slurry in sufficient quantity to inhibit mold growth, the panels become brittle and crack or chip as they are moved along the rollers from the kiln during normal manufacture.

Another technique of protecting a gypsum panel is using a two-step process of covering a biocide-containing gypsum slurry with a treated paper. In addition to many of the problems discussed above, use of a two-step process is more expensive than a single step process. Thus, although many biocides are well known, this particular application poses unique problems in finding a biocide that inhibits mold growth in both the paper and the core of gypsum panels in a cost effective manner.

Pyrithione salts are well-known antimicrobial additives for coating applications. They are available commercially as sodium OMADINE® or zinc OMADINE®, manufactured by Arch Chemicals, Inc. of Norwalk, Conn., or they can be made according to the process of U.S. Pat. No. 3,159,640, incorporated herein by reference. The prior art teaches that these salts are useful in their wet state as preservatives or as short-term antimicrobial agents in dry, thin-film applications such as paints, adhesives, caulks and sealants. U.S. Pat. No. 5,939,203 issued to Kappock et al., incorporated herein by reference, discloses that joint compounds and patching compounds are suitable base media for use with pyrithione salts in coating compositions. Joint or patching compounds are thinly spread over joints between or imperfections in gypsum panels, forming a thin film. The use of sodium pyrithione in these compounds acts as a wet state preservative for ready mixed products and inhibits microbial growth on the dry film of the product.

Traditional Manila papers, however, are fashioned to be aesthetically pleasing. To obtain a finish that is looks appealing, it is necessary to treat the exposed surface of the paper so that the paper is finished, can be painted, has a pleasing appearance and has a smooth surfacing, without the labor intensive requirement of re-finishing. Fly Leaf fibers are often used in papers for gypsum panels because they are short fibers that naturally form a relatively smooth surface. The paper is calendared to give it a smooth, glossy finish. Use of Kraft fibers is currently limited to papers used on the back side of gypsum panels or in plies that are not exposed to the visible surfacing.

Since Kraft fibers are typically longer, softwood fibers, when forming a paper of Kraft fibers, the surface is rough as compared to Fly Leaf fibers. Papers prepared with Kraft fibers also have a darker color than those made of Fly Leaf fiber. If paint is applied as a finish, additional coats may be required to obtain a true color if a surface size is not applied. Another problem with using Fly Leaf fibers in a visible face occurs when the surface sizing is not uniformly applied. Fly Leaf waster fibers contain more ash and are prepared by the thermal mechanical pulping process that requires more internal size. This can lead to uneven color or texture across the surface of a panel that is unappealing. As such, Kraft fiber papers typically are exposed to the wall cavity to minimize finishing and refinishing procedures.

Papers, such as those containing Fly Leaf fibers, are finished to have a pleasing appearance and smooth surfacing require additional chemicals to impart water resistant properties and retain the smaller hardwood or Fly Leaf fibers. When treated with a biocide solution, however, only about 65% to about 75% of the solution is retained by the Fly Leaf and/or News fibers. As biocides are an expensive component of the panel, cost prohibits the use of large amounts of biocides where little is retained by the paper. In addition, panels including Fly Leaf and News fibers typically have an inconsistent finish with respect to color.

SUMMARY OF THE INVENTION

A mold-resistant gypsum panel having improved mold- and fungal-resistance paper is provided. Mold- and fungal-resistant gypsum panels include a gypsum core formed from a gypsum slurry that has voids that are a result of foaming of the gypsum slurry. On one side of the dried gypsum core is a first paper, which typically faces the inside of a room or finished area. The opposite side of the gypsum core has a second paper, which typically faces the studs or other support structure. In addition, each of the first and second papers include at least one liner ply and at least one filler ply. One of the at least one liner ply or the at least one filler ply is comprised substantially of all Kraft fibers and retains at least 75% of a biocide that is applied to the paper.

Kraft fibers used in papers for gypsum panels have been found to retain more biocide than Fly Leaf and News fibers. Use of Kraft fibers in at least one of the plies of the paper improves biocide retention, reduces the amount of a sizing agent that is needed within the liners, reduces use of retention aids, lowers the paper weight and allows higher machine speeds. Moreover, Kraft fibers used in the present mold-resistant gypsum panels have an aesthetically pleasing appearance without requiring refinishing. This is achieved utilizing a combination of plies within the paper with at least one sizing agent and at least one retention aid.

In one embodiment, a paper for use in a mold-resistant gypsum panel is provided. The paper includes at least one liner ply and at least one filler ply. A first biocide is added to one of the at least one liner ply or at least one filler ply and is retained at least 75%. At least one filler ply is located between the at least one liner ply and a second filler ply or a gypsum core that is formed from a gypsum slurry. Moreover, at least one of the at least one liner ply or the at least one filler ply also includes a retention aid and a sizing agent.

In yet another embodiment, a mold-resistant gypsum panel is provided. The mold-resistant gypsum panel includes a gypsum core which is formed from a gypsum slurry, a first paper and a second paper. The first paper has at least one liner ply that is substantially all Kraft fibers and retains at least 75% of an applied biocide and further includes at least one liner ply and also includes at least one filler ply.

A second paper is also provided in the mold-resistant gypsum panel and includes at least one liner ply and at least one filler ply. In addition, mold-resistant gypsum panels in accordance with an embodiment of the invention include a sizing agent and a retention aid located in at least one of the first paper or the second paper. Additionally or alternatively, embodiments of the present invention include a first paper having a substantially similar paper structure to the second paper.

In accordance with still another embodiment of the invention, a method for forming a mold-resistant gypsum panel is provided. The method includes forming at least one liner ply having a first surface and a second surface. Preferably, at least one of the at least one liner ply is comprised essentially of Kraft fibers and retains at least 75% of an applied biocide. The combination of the at least one liner ply and the at least one filler ply forms a first paper.

A biocide is preferably added to the first paper. Preferably, the first paper is composed of substantially all Kraft fibers and retains at least 75% of the applied biocide. In addition to the biocide, it is preferred that the first paper also be treated with a retention aid and a sizing agent.

Once the first paper is completed, a gypsum core formed from a gypsum slurry is deposited on top of the first paper. A second paper is then deposited opposite the first paper, with the gypsum core between. A second biocide may be added to the second paper. The first biocide and second biocide may be the same biocide. Once a paper is added to opposing sides of the gypsum core, the panel can be finished and gypsum panel is formed.

Other features of the invention will be apparent from the following detailed description and from the claims.

DETAILED DESCRIPTION OF THE INVENTION

Mold-resistant gypsum panels are used in areas prone to moisture. The use of biocides in a paper and a gypsum core of a gypsum panel reduce mold growth when water is present. However, when a biocide is added to the paper, not all of it is retained by fibers within the paper. Some of this expensive biocide additive is discharged with excess water; particularly when a vacuum is applied in order to form and dry the paper. The cost of a biocide alone is expensive and can be up to approximately 35% of the paper manufacturing cost.

Retention of the biocide is improved by modifying the paper composition. A typical paper includes at least one liner ply. It is contemplated that papers of the present invention include at least one liner ply and at least one filler ply. In many embodiments of the present invention multiple liner plies and multiple filler plies are used.

A gypsum panel includes a gypsum core that has a paper on either side: a "stud face" or "back face" and a "finishing face side" or "front face." The gypsum core is formed from a gypsum slurry and includes an interlocking matrix of calcium sulfate dihydrate crystals. Calcined gypsum, also known as stucco or calcium sulfate hemihydrate, is preferably used in a gypsum slurry to make the gypsum core. Any calcined gypsum comprising calcium sulfate hemihydrate or water-soluble calcium sulfate anhydrite or both is useful. Calcium sulfate hemihydrate produces at least two crystal forms, an alpha and a beta form. The beta calcium sulfate hemihydrate is commonly used in the gypsum panels, but it is also contemplated that alpha calcium sulfate hemihydrate may also be useful in this invention. Either one or both of these forms is used to create a preferred gypsum core that is at least about 35% gypsum based on the weight of the building panel. Preferably, the amount of gypsum is at least about 50% by weight.

When mixed with water, the calcined gypsum forms a slurry that hydrates to form the interlocking matrix of calcium sulfate dihydrate crystals. The term "excess water" is intended to refer to water needed for flowability of the gypsum slurry that is in excess of that needed for hydration. Set time modifiers, such as set accelerators and/or set retarders are optionally added to the gypsum slurry to adjust the set time to the appropriate manufacturing process as would be appreciated by those skilled in the art. Gypsum panels that are made on high speed manufacturing lines, such as SHEET-ROCK® building panels from United States Gypsum Co. (Chicago, Ill.), must have sufficient strength to be cut and moved into a kiln within minutes of exiting a slurry mixer. Set accelerators or set retarders are used in some embodiments to adjust the set time at the cutting knife. Other common gypsum slurry additives include fibers, strength enhancing additives, foam, biocides, fillers, binders and mixtures thereof, all of which are contemplated for use in the present invention.

A facing paper is preferably bonded to the front face of the gypsum core. The "front face" or "finishing face" is defined as that surface of the paper which looks toward the occupied portion of the space being finished with the building panels. Preferably, the finish of the front face has a uniform color and texture. In some embodiments, it also has a light or white color. The front face includes at least one liner ply that acts as a front surface for the gypsum panel. It is contemplated that filler plies may also be included and formulated for specific purposes, such as, for example, reinforcing strength. Each filler ply is located between the at least one liner ply and the gypsum core. The front face paper is also preferably paintable such that the finished gypsum panel is able to receive a coating of paint without being absorbed into the front facing paper and creating an uneven finish.

The "back face" or "stud face" is the second surface of the gypsum panel that opposes the front face and looks toward the wall studs, insulation or other supporting structures. The back face includes a second paper, known as the back face paper and opposes the front face paper. It is contemplated that the front face paper and the back face paper may include any number of liner and filler plies. Selection as to the back face paper material preferably depends on the use to which the building panel will be put, however, it is contemplated that any facing material can be used as the back face paper. In one embodiment, the back face paper is composed of the same material as is the front face paper, such that the front face paper and the back face paper of the gypsum panel are substantially similar. Embodiments of the gypsum panel can be used for sound control and preferably utilize a sound absorbent material as the back face. Face papers made of Kraft fibers may also be used on the back face in many building panels. Other suitable face paper materials include fiberglass, plastic or any face material as will be known by those skilled in the art.

Each liner ply preferably includes a first surface and a second surface. The first liner ply of the gypsum panel paper has a first surface that is exposed to the interior of a room that preferably has a uniformly textured finish that can be painted, if the first liner ply is part of the front face paper. Alternatively, the first liner ply can have a first surface that is exposed to the interior of a wall, and is not seen, in the case where the liner ply is part of the back face paper. Whether for the front face paper or for the back face paper, each liner ply includes a second surface that is adjacent to any of a second liner ply, a filler ply or the gypsum core. If a second liner ply is present, the second surface of the first liner ply is adjacent to the first surface of the second liner ply. The second surface of the second liner ply will then be adjacent to any of a third liner ply, a filler ply or the gypsum core. It is contemplated that any number of liner plies as desired can be added in this manner. Similarly, any number of filler plies may be used in papers according to the present invention. The first filler ply, however, will have a first surface that is adjacent to the at least one liner ply. The second surface of the first filler ply is adjacent to either a second filler ply or to the gypsum core. If a second filler ply is present, the first surface of the second filler ply is adjacent to the second surface of the first filler ply. The second surface of the second filler ply is adjacent to either the first surface of a third filler ply or the gypsum core.

It is contemplated that any number of filler plies as desired can be added in this fashion and that any number of liner plies may be present between the gypsum core and the filler plies. Accordingly, in some embodiments, at least one liner ply is used and at least one filler ply is used. Preferably, several liner plies are used and several filler plies are used. More preferably, about two liner plies are used and about five filler plies are included.

Substantially all of the fibers in at least the front face paper are Kraft fibers. Kraft fibers are made from the Kraft or sulfate process that involves the use of sodium hydroxide and sodium sulfide to extract lignin from wood chips in large pressure vessels called digesters. Kraft fibers are long fibers that produce a rough surface on the surface of paper used in gypsum panels and, in addition, are stronger than any other fibers made from other pulping processes. The process of Kraft pulping removes most of the lignin present originally in the wood. The hydrophobic nature of lignin interferes with the formation of hydrogen bonds between cellulose (and hemicelluloses) in the fibers needed for the strength (tensile strength and resistance to tearing) of the paper. Fly Leaf waste paper contains more lignin because the thermal mechanical or groundwood pulping process removes less lignin than the Kraft pulping process.

Kraft fibers also retain a biocide within the fibers more efficiently than previously used Fly Leaf and News fibers because, among other reasons, the individual Kraft fibers are much longer in size than that of the Fly Leaf and News fibers and also because the Kraft fibers exhibit a higher degree of porosity. As a result, more of the biocide is retained within a paper that includes Kraft fibers.

It is contemplated that papers in accordance with the present invention utilize any number of treatment methods in order to combine the paper and the biocide. The biocide is optionally added to the wet end of the papermaking process, before the paper is formed, dewatered and pressed. An example of a wet end technique is addition of the biocide to the paper furnish, ensuring that it is present throughout the entire thickness of the paper fibers. Another option is to add the biocide during dry end processing. Dry end processes include addition of additives, drying and calendering the paper. Methods of biocide addition include but are not limited to, coating or spraying a paper with a biocide, immersing the paper in a biocide dispersion and other methods as would be appreciated by those of ordinary skill in the art.

In some embodiments of the invention, paper travels through a wet calender stack after the paper is formed and dried to 0% moisture. As the paper travels through the calender stack, water is applied to both paper surfaces to soften and smooth out the paper. The paper exits the calender stack at about 7.5% moisture.

Normally, water is applied only to the side of the paper that binds to the gypsum core. However, in this invention, a treating solution is added to each side of the paper by using, for example, one or more waterboxes. One method of applying the treating solution uses separate waterboxes, one for the front face and one for the back face. Two tanks, a mix tank and a run tank, are optionally positioned upstream of each of the waterboxes. Water, sizing, biocide and other chemical additives are combined in the mix tank. The mix tank provides treating solution to the run tank and the solution is recycled back from the waterbox to the run tank. Treating solution is routed from the mixing tank as the run tank is depleted. Optionally, treating solution is fed to both water boxes from a single set of mix and run tanks or from a second set of mix and run tanks may be used to treat the top and bottom plies differently to combine synergistically fungicides.

Various types of biocides are contemplated, including pyrithione salts and other biocides as would also be appreciated by those of ordinary skill in the art. As set forth in U.S. Pat. No. 3,918,981, issued to Long and assigned to U.S. Gypsum, incorporated herein by reference, a family of generally highly effective biocides are water-insoluble metal quinolinolate salts. Some quaternary ammonium compounds are known to have biocidal activity. Examples of inorganic biocides include boron compounds such as boric acid, copper compounds and zinc compounds.

Biocides utilized in the present gypsum panels are either applied to the front face paper, the back face paper, mixed in with the gypsum slurry or any combination thereof. If applied to the front face paper or back face paper, it is contemplated that the porosity of the paper promotes spreading of the biocide to other plies of the paper. The biocide is carried with water, for example, by capillary action or by movement of the water during the drying process. Additionally or alternatively, should the biocide be mixed with the gypsum core, it is contemplated that the biocide may disperse from the gypsum core outward to the liner plies of the paper due to the more uniform porosity of the Kraft paper and also as a result of the biocide migrating with the excess water from the gypsum core during drying.

The front face paper preferably includes a first surface of a liner ply that is exposed and ready for finishing. A first biocide is preferably treated on the front face paper. The front face paper also preferably includes a first fiber consisting of essentially of all Kraft fibers. A first binder can also be included in the front face paper. It is contemplated that more than one liner is used in papers in accordance with the present invention. Moreover, the back face paper preferably includes a first surface of a liner ply that is not exposed for finishing, i.e., faces opposite the interior of the room. A second biocide is preferably treated on the back face paper. A second fiber is typically also included in the back face paper. In addition, it is contemplated that the back face paper may include a second binder. It is also contemplated that the back face paper may be substantially similar to the front face paper, and includes similar or substantially similar biocide(s), fiber(s) and/or binder(s).

Biocides for use with gypsum slurries and papers of the present invention include, for example, diiodomethyl-p-tolylsulfone, such as sold by Dow Chemical from under the name FUNGI-BLOCK® brand fungicide. It is contemplated that the first biocide for the front face paper and the second biocide for the back face paper may be different, the same or include a mixture of biocides. Other examples of biocides for use in the present invention include pyrithinone salts, such as sodium pyrithinone, and diiodomethyl-p-tolylsulfone. It is also contemplated that a third biocide may be included within the gypsum slurry. Additionally or alternatively, the third biocide may also be treated on either the front face paper, the back face paper or a combination of the front and the back face papers. This third biocide may be the same, different or include a mixture of the biocides. It is contemplated that any number of biocides may be used in accordance with the present invention, depending on the number of plies and retention of the fibers within the papers and gypsum slurry.

Those biocides that are generally recognized as safe can be used in surface coatings, including citric acid, glycerin, ascorbic acid and benzoic acid; potassium sorbate; borax; chelated copper; biocides including a silver coating; sodium silicate; potassium silicate; matrix metalloproteinase inhibitors and matrix metalloproteinase inhibitors doxycycline; methyl benzidizole-2-yl-carbonate; 3-iodo-2-propynl butylcarbamate and pyrithione salts. Internal applications of biocides include: thiabendazole; propiconazole; silver zeolite; benzodioxalcarbonitrile; silicone quaternary ammonium salts; zinc oxide and diiodomethyl-p-tolylsulfone. Various mixtures and concentrations of each of these biocides alone or in combination with one another could be used in mold-resistant gypsum panels.

Biocide retention is difficult to measure accurately because the biocide concentration in the fiber/water suspension and in the whitewater is relatively low. Approximately 60 parts per million of biocide is measured in the fiber/water suspension and 30 parts per million is measured in the whitewater. The percent coefficient of variation is typically about 10% to about 15% with a test method at a concentration of about 100 parts per million. The biocide retention values can be about 50% off the stated number, thereby making it easier to rely on first pass retention.

In use, there is an estimated cost of $1200/day to $1850/day if the first pass fiber retention of the biocide is reduced by 5% to the mill. The first pass retention of the biocide by the fiber is typically about 65% to about 75% when making a paper with Fly Leaf and News furnish, which is increased to about 75% to about 90% retained biocide by the fiber when the fiber is changed to Kraft paper. The savings will be less than two to three times based on the estimated cost listed above because this number is fiber retention and not biocide retention. Preferably, the first pass fiber retention of Kraft fibers is about 90% to about 95% retained biocide by the fiber.

If any biocide is not retained in the paper then the biocide will eventually leave the plant through the wastewater process. Depending on local governments and discharge permits, the mold-resistant grade may be manufactured only with retention aids and or inorganic microparticles such as colloidal silica or coagulants to minimize biocide contaminated wastewater.

Binders or surface size for use with gypsum panels of the present invention include starches, carboxyl methyl cellulose and conventional latex binders, such as poly(vinyl acetate), poly(ethylene-co-vinyl acetate), and wax emulsions are preferred and are included in a range from about 1 to about 15 percent by weight of the composition. These are typical surface sizes used by the industry to improve the water resistance properties of the paper surface.

Fibers for use with gypsum panels of the present invention include Fly Leaf, News, Kraft fibers and/or combinations thereof. Kraft fibers are preferred in the present invention, as described above, due to the ability to retain more of the biocide and the uniform porosity. It is contemplated that fibers may be recycled from papers and boxes. When using recycled fibers, it is necessary to dilute and thicken the pulp before utilizing in the paper, as many impurities, such as glue, will be in the recycled water.

In addition, it is contemplated that paper used herein preferably includes at least one liner ply and more preferably at least one liner ply and at least one filler ply. Gypsum panels in accordance with embodiments of the present invention include seven different plies. Of the different plies, each gypsum panel paper preferably includes two liner plies and five filler plies. Each liner ply is a paper that is made of substantially all Kraft fibers. The liner plies are closest to the surface of the gypsum panel, or the front or back face. It is contemplated that the number of liner and/or filler plies will vary with the desired use for the gypsum panel. Any number of filler plies may be used. The filler plies are plies that are located between any liner plies and the gypsum core.

It is contemplated that any of the liner or filler plies within the papers may include additional additives to improve characteristics of the papers and/or the gypsum panel. These additives include, but are not limited to, strength enhancing additives, starches, fillers and mixtures thereof.

Paper fibers are typically formed with recycled papers. Therefore, when processing these fibers, contaminants such as staples, inks and adhesives are preferably removed during processing of the fibers for use in the paper. By changing the paper fibers from Fly Leaf and News to Kraft fibers, the retention of biocide was improved. This reduces the overall cost of the biocide treated in the Mold Tough Manila (MT Manila) paper. Besides improvement in biocide retention, other benefits include: use of less retention aid, use of less of an internal sizing agent in the liner, lower paper weight and higher machine speed. By utilizing the Kraft fiber, the gypsum panel plant saves energy and increases line speed with more porous paper.

Accordingly, embodiments of the present invention utilize a combination of a biocide, a retention aid and a sizing agent with Kraft fibers in the paper to achieve maximum retention of the biocide in the gypsum panel paper, while at the same time minimizing the amount of effort required to finish the front face for final use, i.e., for painting. Preferably, the amount of biocide used is the least amount to be effective. Not only is the cost a factor in the amount of biocide, but the Environmental Protection Agency also sets maximum legal concentrations each allowable for each biocide for each specific application. For example, no more than 8.21 pounds of biocide per ton (4105 ppm) or 750 mg/m$^2$ of an alternative fungicide can be used in a gypsum paper or gypsum panel. Preferably, at least about 500 parts per million of a biocide is utilized in the gypsum paper. Above about 1000 ppm, the cost of the biocide may be prohibitive and may encourage a new biocide selection. One method of adding the fungicide to the paper is by applying it to the surface of the dried paper, such as by spraying.

An internal sizing agent is also preferably added to the paper to assist in the process of mold-resistance of the gypsum panel. It has been generally found that one way to avoid mold growth is to decrease the ability for water to penetrate the panel. As such, internal sizing agents are often added to reduce the amount of biocide necessary to add to the panel, since the biocide is typically more expensive than the sizing agent. One such internal sizing chemical providing water-resistance is alkylsuccinicanhydride, available from Bercen of Cranston, R.I. Preferably at least about five pounds per ton to about twenty-five pounds per ton of the sizing agent is included. Other internal sizing agents including alkylketene dimer size or a combination of rosin and alum are also suitable for use in the present invention as would be appreciated by those skilled in the art.

The amount of internal sizing agent used is dependant on the desired final water resistance properties of the paper. The average usage rate is about 4 kg/metric ton (10 lb/ton). The range of usage rates of a sizing agent may be as low as about 2 kg/metric ton (5 lb/ton) and as high as about 6 kg/metric ton (15 lb/ton). Preferably, the usage rate of the sizing agent is below about 8 kg/metric ton (20 lb/ton), where the biocide retention has been shown to be very poor. It is contemplated that at about 8 kg/metric ton (20 lb/ton), too many paper making additives interact to obtain good biocide retention. Surface sizing agents or binders of wax, styrene maleic anhydride, polyethylene wax or silicone are also recommended to improve the paper water resistance. Other surface sizing agents are also contemplated for use with the present invention as would be appreciated by those of ordinary skill in the art.

The addition of large amounts of retention aid leads to a decrease in the smoothness of the surface and poor paper formation. Although an increase in retention aid is acceptable for a back face, it is not preferred in high amounts for the front face, due to the undesirable finish. Fly Leaf and News fibers are typically shorter than Kraft fibers and are typically bleached. As such, utilizing Kraft fibers in the front face for a gypsum panel requires a more processing for finishing. A typical finishing process for a panel having a face comprising Fly Leaf and News fibers includes little or no refining the surface fibers to the desired paper finish and applying very little or no retention aid, high amounts of sizing agent and biocide until the desired face paper finish is achieved. Kraft fibers are typically longer in size than Fly Leaf and News fibers. Thus, when Kraft fibers are being refined, the fibers are sometimes cut in order to provide a smoother surface. Moreover, Kraft fibers are typically more negatively charged. By adding a low dosage of a cationic chemical, such as a retention aid, the retention of the biocide by the Kraft fibers is improved further.

One example of a retention aid is Nalco 9904 polyacrylamide, available from Nalco of Naperville, Ill. Preferably at least about one half pound per ton to about two and half pounds per ton of retention aid is utilized in embodiments in accordance with the present invention. Other retention aids can also be used in the present invention as would be appreciated by those skilled in the art. The fiber first pass retention is optimized with the best retention aid for the system. The biocide retention is directly related to the first pass fiber retention. It is contemplated that any traditional paper-making chemical retention system would work well even with a cationic coagulant and an anionic polyacrylamide or a microparticle type retention system. The typical rate for a cationic polyacrylamide retention aid is between about 0.4 kg/metric ton (1.0 lb/ton) to about 0.6 kg/metric ton (1.5 lb/ton).

When finishing any gypsum panel, it is preferable to have a surface on the front face having a smooth and uniform finish. Often, the finish of the back face is disregarded, as it typically is not visible from the finished interior of a room. It is contemplated, however, that panels in accordance with the present invention may have a front face paper and a back face paper that are substantially similar. Moreover, it is preferable that gypsum panels in accordance with the present invention have a uniformly textured finish that is able to be painted without additional re-finishing.

In at least one embodiment of the invention, a method for producing a mold-resistant gypsum panel is provided. The method includes forming a paper having at least one liner ply. Preferably, at least one of the at least one liner plies is comprised of substantially all Kraft fibers, although it is contemplated that a combination of Fly Leaf and News fibers with Kraft fibers may also be used. Moreover, it is contemplated that more than one liner ply may be used in mold-resistant gypsum panels in accordance with the present invention. In certain embodiments, several liner plies may be used, where only one or two of the several are comprised of substantially all Kraft fibers. In other embodiments, several liner plies are used and all of the liner plies are comprised of substantially all Kraft fibers. Preferably, two liner plies are utilized that each comprise of substantially all Kraft fibers. Moreover, it is preferred that the two liner plies have a uniformly textured finish that can be painted over without the need for re-finishing.

While typical gypsum panels have various colors and textures for their front and back faces, it is contemplated that mold-resistant gypsum panels in accordance with the present invention have a front face paper that is finished with a uniform appearance and is ready to be painted without requiring re-finishing. For example, some embodiments of a mold-resistant panel has a green or blue surface for ready identification.

It is also contemplated that at least one filler ply may be bound to the interior face of the at least one liner ply. The filler ply includes a liner face and a gypsum core face. The liner face is preferably adjacent to the interior face of the liner ply, while the gypsum core face is preferably adjacent to the gypsum core. The combination of the at least one liner ply and the at least one filler ply forms a first paper. It is contemplated that any number of liners and fillers may be used as desired. Moreover, each filler may reinforce a different physical or chemical characteristic into the gypsum panel. Other filler plies may also be added as would be appreciated by those of ordinary skill in the art.

The biocide, as described above, is preferably added to the front face paper and/or the back face paper. In certain embodiments, it is contemplated that the biocide may be added only to the gypsum core. In other embodiments it is contemplated that a biocide is added only to the front face paper. Certain other embodiments contemplate the addition of the biocide only to the back face paper. In still other embodiments, the biocide is added to any combination of the front face paper, the back face paper and the gypsum slurry. Moreover, it is contemplated that the biocide is able to migrate through the Kraft fibers of the papers more evenly, such that, for example, if the biocide were only added to the gypsum core, the biocide would spread evenly through the gypsum core to the front face and back face papers.

The biocide can be added to the front or back face paper in any number of ways as would be appreciated by those skilled in the art. For example, in certain embodiments the biocide is added during the paper formation, during slurry formation, coated on following paper formation or sprayed on. Other methods of adding the biocide are also contemplated to be within the scope of the invention. Preferably, the papers retain at least 75%, or at least 80%, of the applied biocide. It is also contemplated any remaining biocide will be contained in the water extracted from the paper during its manufacture, which can then be treated by the wastewater system.

In addition to the biocide, it is preferred that the face papers are also treated with a retention aid and a sizing agent, which may be added to the paper in accordance with methods similar to that of the biocide, as would be appreciated by those skilled in the art. Other additives as are known in the art may also be utilized with the Kraft paper liner. An example of an additive is a dry strength additive, such as Hercobond 6350 by Ashland Hercules of Wilmington, Del. This additive is a polyacrylamide having a molecular weight of about 100,000 to about 500,000 Daltons. It is typically used in amounts of about 0.8 kg/metric ton (2 pounds/ton) to about 4 kg/metric ton (10 pounds per ton) of paper.

Once the front and back face papers are completed, a gypsum slurry can be applied to the core face of the at least one filler ply of either the front or back paper. The other of the front or back face paper is applied and the slurry is sandwiched between the two papers to form the panel product. It is also contemplated that a gypsum panel can be made using the paper facing on one side and either no facing or a non-paper facing on the other side. Examples of non-paper facings include polymer or fiberglass mats or plastic sheets. Once the gypsum panel has been formed it is dried in a kiln to drive off moisture in excess of that needed for hydration. The gypsum panel is now finished using finishing processes as would be appreciated by those skilled in the art, including, but not limited to, cutting the gypsum panel to a desired size and other finishing processes.

The following example illustrates certain embodiments and aspects of the invention and should not be construed as limiting the scope thereof.

EXAMPLES

MT Manila paper is commonly used for water-resistant gypsum panels. A modified water-resistant gypsum panel made with MT Manila paper was developed by adding a biocide to the liner plies of the paper. The physical properties of the previously used MT Manila paper and the improved fungicidal MT Manila paper are described below in Table 1:

TABLE 1

| Paper Grade | MT Manila Paper | MT Manila Paper w/Biocide |
|---|---|---|
| Application | Inside - Bathrooms and Kitchens | Inside - Bathrooms and Kitchens |
| Total Paper Plies | 7 | 7 |
| Paper Plies (liner) | 2 | 2 |
| Paper Plies (filler) | 5 | 5 |
| Liner Furnish | Fly Leaf & News | Kraft Fiber |
| Filler Furnish | Kraft Fiber | Kraft Fiber |
| Surfacing Sized | 5.1 kg/1000 m$^2$ (1 lb/MSF) | 5.1 kg/1000 m$^2$ (1 lb/MSF) |
| Internal Size (liner) | 2 kg/metric ton (5 lb/ton) | 1.2 kg/metric ton (3 lb/ton) |
| Internal Size (filler) | 1.2 kg/metric ton (3 lb/ton) | 1.2 kg/metric ton (3 lb/ton) |
| Production Rate (est.) | 850 ft/min | 1000 ft/min |
| Paper Weight (est.) | 227 kg/1000 m$^2$ (45 lb/MSF) | 212 kg/1000 m$^2$ (42 lb/MSF) |
| Retention Aid (Liner) | 10 kg/1000 m$^2$ (2 lb/MSF) | 5.1 kg/1000 m$^2$ (1 lb/MSF) |
| Retention Aid (Filler) | 5.1 kg/1000 m$^2$ (1 lb/MSF) | 5.1 kg/1000 m$^2$ (1 lb/MSF) |
| Gypsum Board Drying Rates | Harder | Easier |
| Color & Appearance | Less Uniform | More Uniform |
| Water Resistance | Less per of kg size | More per kg of size |
| First Pass Retention (Liner) | 60 to 70% | 80 to 90% |
| Water Resistance | Higher Variability | Low Variability |
| Porosity | Low | High |

Trials were completed by manufacturing a MT Manila and paper that is fungal resistant. The biocide cost is about $180/metric ton of paper produced. This can cost a small paper mill $44,000 per day and a large paper mill almost $66,000 per day in biocide alone. The large chemical expense makes it advantageous to have high biocide retention in the paper rather than allowing it to discharge into the sewer or other waste means. The cost of paper manufacturing exclusive of the biocide is about $318 per metric ton ($350 per ton).

Biocides are expensive chemicals, so higher biocide retention translates to lower cost. FUNGI-BLOCK® is about $8.40/kg ($21/lb) at 40% active or about $21/kg ($52.5/lb) at 100% active ingredient. The present FUNGI-BLOCK® application rate is 1000 parts per million or 0.81 kg/metric ton (2 lbs/ton) of the active component. A typical paper mill manufactures about 202 to about 315 metric tons (about 225 to about 350 tons) per day of paper depending on machine width and other factors. In addition to reduction in biocide costs, the amount of retention aid and internal sizing can be reduced by using the Kraft lining described here.

This data also shows an increase in the production rate of the paper. Almost 20% increase in production speed was realized using the Kraft fibers for the liner plies. Better utilization of the paper-making equipment and personnel should result in lower production costs. In some plants, production rates could be increased by 48 linear meters (150 linear feet) per minute.

Improved color uniformity was noted, as well as better water resistance, when Kraft paper was used in the liner furnish. The amount of retention aid in the liner was reduced. Porosity of the board also increased, leading to faster board drying rates. The amount of fossil fuels needed to maintain the drying kilns can be reduced, or, in plants that are kiln limited, faster drying can result in an increase in production.

The stronger Kraft fiber length is longer and the ability to form hydrogen bonds reduces the amount of retention aid, internal sizing and weight of the final paper from 227 kg/1000 m$^2$ to 212 kg/1000 m$^2$ (45 pounds/1000 ft$^2$ to 42 pounds/1000 ft$^2$). The lower product weight results in less material handling, lower shipping costs and lower energy use throughout the process.

While a particular embodiment of the present mold-resistant gypsum panels have been described herein, it will be appreciated by those of ordinary skill in the art that changes and modifications may be made thereto without departing from the invention in its broader aspects and as set forth in the following claims.

What is claimed is:

1. A paper for use in a mold-resistant gypsum panel, comprising:
    at least one liner ply; wherein said at least one liner ply is composed of substantially all Kraft fibers and retains at least 75% of a first biocide applied to said paper; and
    at least one filler ply; wherein at least one of said at least one filler ply and said at least one liner ply includes a sizing agent and a retention aid.

2. The paper of claim 1 wherein said first biocide is selected from the group consisting of citric acid, glycerin, ascorbic acid; benzoic acid; potassium sorbate; biocides including a silver coating; borax or boron type additives; sodium silicate; potassium silicate; matrix metalloproteinase inhibitors; copper carbonate or copper sulfate or various forms of copper cations; zinc sulfate or zinc cations; matrix metalloproteinase inhibitors having doxycycline; pyrithione salts; thiabendazole; propiconazole; benzodioxalcarbonitrile; silver zeolite; silicone quaternary ammonium salts; zinc oxide; methyl benzidizole-2-yl-carbamate; 3-iodo-2 propyni butylcarbamate and diiodomethyl-p-tolylsulfone.

3. The paper of claim 1 wherein a second of said at least one liner ply or a second of said at least one filler ply includes a second biocide.

4. The paper of claim 3 wherein the said first biocide and said second biocide are the same biocide.

5. The paper of claim 1 wherein said retention aid is a high molecular weight cationic polyacrylamide.

6. The paper of claim 1 wherein said surface sizing agent is one of wax, styrene maleic anhydride, polyethylene wax, silicone, carboxyl methyl cellulose, alkylketene dimer or mixtures thereof.

7. The paper of claim 1 wherein said internal sizing agent is one of alkylsuccinicanhydride, alkylketene dimer or a combination of rosin and alum.

8. The paper of claim 1 wherein said at least one liner ply or said at least one filler ply includes at least one additive selected from the group consisting of a strength enhancing additive, starch, cationic starches, gloxylate polyacrlyamides, medium molecular weight polyacrlyamides and mixtures thereof.

9. The paper facing furnish of claim 1 including two liner plies.

10. A mold-resistant gypsum panel comprising:
    a gypsum core formed from a gypsum slurry;
    a first paper, wherein said first paper comprises at least one liner ply; wherein said at least one liner ply is composed of substantially all Kraft fibers and retains at least 75% of a first biocide applied to said at least one liner ply; further wherein said first paper also includes at least one filler ply; and
    a second paper, wherein said second paper comprises at least one liner ply; wherein said at least one liner ply retains at least 75% of a second biocide applied to said at least one liner ply; wherein said second paper also includes at least one filler ply;
    wherein said gypsum core is located between said first paper and said second paper and further wherein at least one of the said first paper or said second paper includes a sizing agent and a retention aid.

11. The mold-resistant gypsum panel of claim 10 wherein said second paper includes substantially similar at least one liner plies and at least one filler plies as said first paper.

12. The mold-resistant gypsum panel of claim 10 wherein said first biocide is selected from the group consisting of citric acid, glycerin, ascorbic acid; benzoic acid; potassium sorbate; biocides including a silver coating; sodium silicate; potassium silicate; matrix metalloproteinase inhibitors; matrix metalloproteinase inhibitors having doxycycline; pyrithione salts; thiabendazole; propiconazole; benzodioxalcarbonitrile; silver zeolite; silicone quaternary ammonium salts; zinc oxide; methyl benzidizole-2-yl-carbamate; 3-iodo-2 propynl butylcarbamate and diiodomethyl-p-tolylsulfone.

13. The mold-resistant gypsum panel of claim 10 wherein said gypsum core further includes a third biocide.

14. The mold-resistant gypsum panel of claim 10 wherein said first biocide is the same as said second biocide.

15. The mold-resistant gypsum panel of claim 13 wherein said third biocide is the same as either of said first biocide or said second biocide.

16. The mold-resistant gypsum panel of claim 10 wherein said retention aid is a high molecular weight cationic polyacrylamide.

17. The mold-resistant gypsum panel of claim 10 wherein said surface sizing agent is one of wax, styrene maleic anhydride, polyethylene wax, silicone or mixtures thereof.

18. A method for forming a mold-resistant gypsum panel, the method comprising the steps of:
    forming at least one liner ply having a first surface that faces a room upon installation and a second surface that faces the interior of the finished panel; wherein said at least one liner ply is composed of substantially all Kraft fibers and retains at least 75% of a first biocide;

binding at least one filler ply to a second surface of said at least one liner ply, wherein the combination of said at least one outer liner ply and said at least one filler ply form a first paper;

adding a biocide to said first paper, wherein said first paper retains at least 75% of said biocide;

forming a second paper having at least one liner ply and at least one filler ply; wherein said at least one liner ply having a first surface that opposes a room upon installation and a second surface that faces the interior of the finished panel;

treating at least one of said first paper and said second paper with a retention aid and a sizing agent;

forming a gypsum core from a gypsum slurry;

adding said gypsum core to a second surface of said at least one filler ply of said first paper; and adding said second paper opposite said first paper to said gypsum core to form a gypsum panel, wherein said gypsum panel is then finished using a finishing process.

19. The method of claim 18 wherein said first biocide is selected from the group consisting of citric acid, glycerin, ascorbic acid; benzoic acid; potassium sorbate; biocides including a silver coating; sodium silicate; potassium silicate; matrix metalloproteinase inhibitors; matrix metalloproteinase inhibitors having doxycycline; pyrithione salts; thiabendazole; propiconazole; benzodioxalcarbonitrile; silver zeolite; silicone quaternary ammonium salts; zinc oxide; methyl benzidizole-2-yl- carbamate; 3-iodo-2 propynl butyl-carbamate and diiodomethyl-p-tolylsulfone.

20. The method of claim 18 wherein said retention aid is a high molecular weight cationic polyacrylamide.

21. The method of claim 18 wherein said sizing agent is one of alkylsuccinicanhydride, wax, styrene maleic anhydride, polyethylene wax, silicone or mixtures thereof.

* * * * *